United States Patent
Lang

(10) Patent No.: US 8,745,848 B2
(45) Date of Patent: Jun. 10, 2014

(54) INDUCTION MACHINE ROTOR SLOT HAVING DIVERGING SIDEWALL PROFILES AND FORMING METHOD

(75) Inventor: Nicholas G. Lang, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 169 days.

(21) Appl. No.: 13/221,107

(22) Filed: Aug. 30, 2011

(65) Prior Publication Data

US 2013/0049517 A1  Feb. 28, 2013

(51) Int. Cl.
*H02K 15/02* (2006.01)

(52) U.S. Cl.
USPC ............................................. 29/598; 310/211

(58) Field of Classification Search
USPC .......... 310/211, 156.78, 156.81; 29/732–736, 29/596–598, 592.1
See application file for complete search history.

(56) References Cited

U.S. PATENT DOCUMENTS

| | | | |
|---|---|---|---|
| 2,372,590 A | | 3/1945 | Ljunggren |
| 2,930,916 A | * | 3/1960 | Scanlon et al. .......... 310/156.76 |
| 4,302,693 A | * | 11/1981 | Burgmeier et al. ...... 310/156.59 |
| 4,339,874 A | * | 7/1982 | Mc'Carty et al. ................ 29/598 |
| 4,843,271 A | * | 6/1989 | Shah ............................. 310/214 |
| 6,232,692 B1 | * | 5/2001 | Kliman ........................... 310/211 |
| 6,271,613 B1 | * | 8/2001 | Akemakou et al. ........... 310/181 |
| 6,891,299 B2 | * | 5/2005 | Coupart et al. .......... 310/156.55 |
| 7,596,856 B2 | * | 10/2009 | Berwald et al. ................. 29/605 |
| 7,690,111 B2 | * | 4/2010 | Coffey et al. ................ 29/889.1 |

FOREIGN PATENT DOCUMENTS

DE   1751477 U   8/1957
DE   102005004566 A1   8/2006

OTHER PUBLICATIONS

PCT International Search Report mailed Jun. 5, 2013 corresponding to PCT Application No. PCT/US2012/052980 filed Aug. 30, 2013 (11 pages).

* cited by examiner

*Primary Examiner* — Minh Trinh

(57) ABSTRACT

A method for forming rotor bar slots in an induction machine rotor includes providing a rotor body having an outer circumference, a central axial axis and a radial axis and forming opposed first and second rotor slot sidewalls having profiles diverging outwardly in opposite directions from the rotor radial axis. The opposed first and second rotor slot sidewalls are formed using a cutting tool having a first rotational axis oriented at a first angle outwardly diverging from the radial axis and with a second cutting tool having a second rotational axis oriented at a second angle outwardly diverging from the radial axis that is opposed from the first angle.

10 Claims, 6 Drawing Sheets

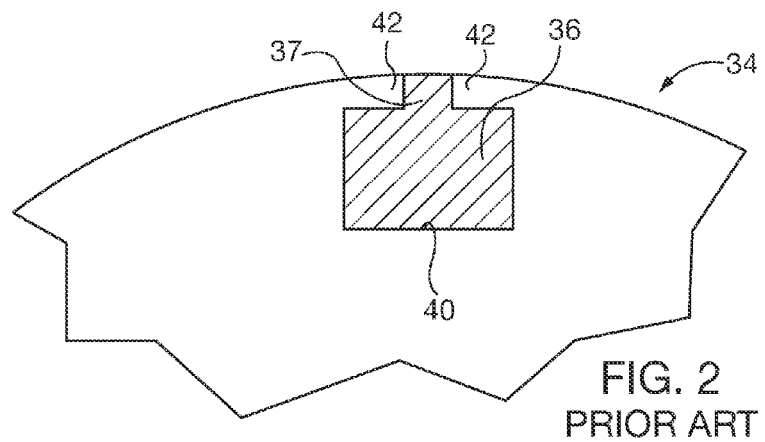
FIG. 2
PRIOR ART
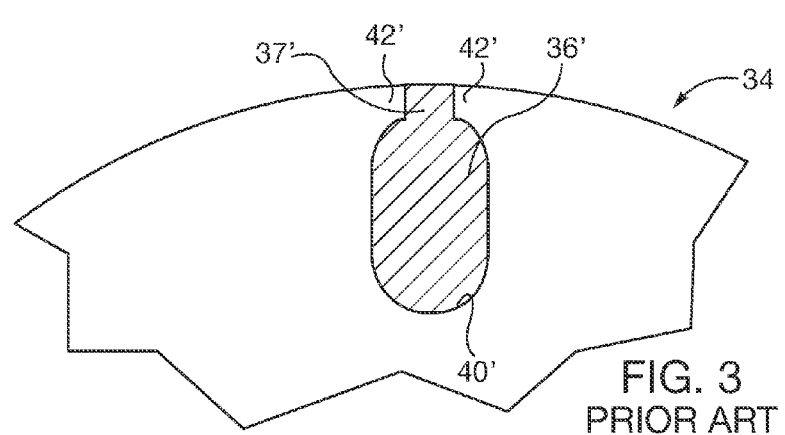
FIG. 3
PRIOR ART
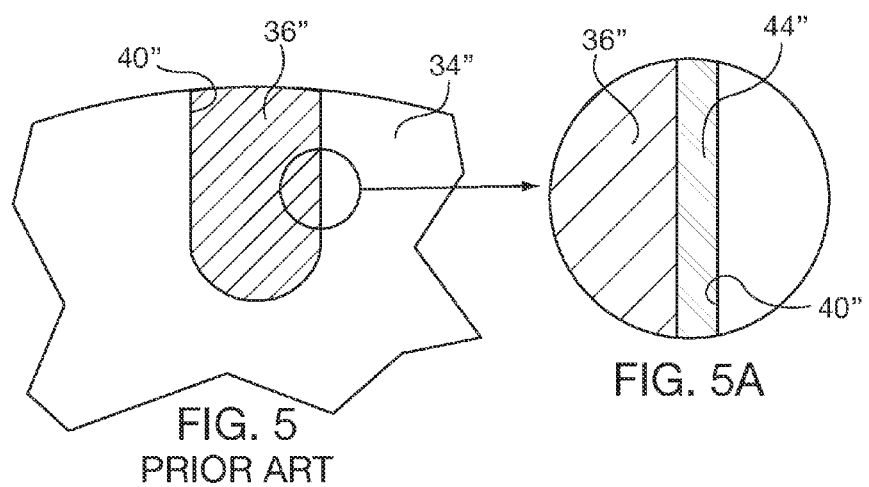
FIG. 5
PRIOR ART
FIG. 5A

INDUCTION MACHINE ROTOR SLOT HAVING DIVERGING SIDEWALL PROFILES AND FORMING METHOD

BACKGROUND OF THE DISCLOSURE

1. Field of the Invention

The invention relates to induction machine rotors and more particularly, rotor slots for retaining rotor bars and methods for forming rotor slots for high speed motors that utilize non-laminated, homogeneous rotor bodies.

2. Description of the Prior Art

Induction machines, such as motors, are constructed with conductive rotor bars that are arrayed within rotor slots. The slots are axially aligned about the rotor body outer circumference. Many motors have laminated rotor bodies that, are formed from a stack of individual stamped metal laminations. In laminated rotor bodies it is often cost effective to stamp cross sectional profiles of rotor slots in each lamination and thereafter forming the individual elongated rotor slots by aligning the stampings axially.

FIG. 1 depicts schematically a known induction motor 20, having a housing 22, stator 24 and bearings 26 it that capture rotating rotor 30. The rotor 30 includes a shaft 32 onto which is concentrically coupled rotor body 34. The rotor body 34 outer circumference retains a plurality of axially oriented rotor bars within integrally formed rotor slots 40. As is shown in FIGS. 2 and 3, typical respective rotor bar 36, 36' cross-sectional configurations have narrow necks 37, 37' on their outer peripheries that mate with corresponding rotor slot tabs 42, 42' formed within the rotor slot 40, 40'. The tabs 42, 42' radially constrain the rotor bars 36, 36'. The radially constrained rotor bars 36, 36' will remain in the rotor slots 40, 42' when centrifugal forces are imparted on them by acceleration of the spinning rotor 30, provided that the tab structures 42, 42' have sufficient strength and elasticity to resist the generated centrifugal forces. The centrifugal forces increase exponentially with rotor rotational speed. Often in the past rotor bars have also been additionally constrained radially by bonding them in their corresponding rotor slots with adhesives, such as epoxy, friction-interference fit, soldering, brazing, shimming and diffusion brazing.

Stamped rotor laminations that incorporate rotor slots are generally constructed of electrical steel with a generally low tensile strength. In higher speed motor applications rotor slot tabs 42, 42' formed in rotor laminations do not have sufficient strength to restrain rotor bars, even when combined with additional adhesive or brazing constraints.

One past solution to restrain rotor bars in higher speed motors is shown in FIGS. 4 and 5. The rotor body 34" is constructed of homogeneous steel, having a higher tensile strength than electrical steel laminations that is capable of resisting higher centrifugal forces imparted on the rotor bars 36" when the rotor is spinning at high speeds. Rotor slots 40" are plunge-machined in the outer circumference of the rotor body 34" with a milling machine ball cutter C, that creates a U-shaped cross-sectional profile with parallel sidewalls oriented parallel to the rotor body radial axis. Lacking any kind, of mechanical interference fit between the rotor bars 36" and rotor slot 40" that is analogous to the rotor slot tabs 42, 42' of FIGS. 1-3, the rotor bars 36" are bonded to the rotor slot 40" by a relatively expensive diffusion brazing process that results in a strong brazing layer 44" between the rotor bar and rotor slot.

It is desirable to restrain rotor bars in rotor slots by resisting centrifugal forces imparted on them with a mechanical, restraint analogous to the rotor slot tabs 42, 42" used in laminated rotor bodies. However, it is difficult to construct such tabs in relatively hard, homogenous ferromagnetic metal rotor bodies.

Thus, a need exists in the art for a rotor body having machined in place rotor slots that are capable of radially restraining rotor bars through mechanical interference, with or without additional constraining methods, such as adhesive bonding or brazing.

SUMMARY OF THE INVENTION

Accordingly, an object of the invention is restrain rotor bars radially within machined rotor slots formed within a rotor body, so that the physical structure of the rotor body material has sufficient strength to resist centrifugal forces imparted on the rotor bars while the rotor spins.

Another object of the invention is to form rotor slots within a rotor body that have physical structure to restrain rotor bars radially by using commonly available machines and cutting heads, as well as common machining methods.

These and other objects are achieved in accordance with the present invention by formed in place rotor bar slots within rotor bodies that have sidewall profiles that diverge outwardly in opposite directions from the rotor radial axis and circumference. The rotor slot profile so formed is analogous to a machined dovetail within the rotor body that mechanically restrains radial separation of the corresponding rotor bar radially outwardly from the spinning rotor body as centrifugal forces are imparted on the rotor bar. The slot profile advantageously may be formed by cutting the opposed first and second sidewalls along a cutting path that is parallel to the rotor central axis. While a single cutting head having the width and angle of both sidewall profiles may be utilized to form the rotor slot, a less expensive simple cylindrical cutting head can be used to form the first and second respective rotor slot sidewalls in two opposed cutting passes along the cutting path.

The present invention features an induction machine rotor comprising a shaft and a rotor body having an outer circumference, a central axial axis concentric with the shaft and a radial axis. A plurality of rotor slots are formed within the rotor of outer circumference parallel to the central axis. Each slot has opposed first and second sidewalls having profiles diverging outwardly in opposite directions from the rotor radial axis and outer circumference. A bottom wall intersects the first and second sidewalls.

Another feature of the present invention is an induction machine rotor formed by the process of providing a rotor body having an outer circumference, a central axial axis and a radial axis. Then, forming opposed rotor slot first and second sidewalls having profiles diverging outwardly in opposite directions from the rotor radial axis and outer circumference by cutting with a cutting tool into the rotor body outer circumference along a cutting path that is parallel to the central axial axis.

Yet another feature of the present invention is a method for forming rotor bar slots in an induction machine rotor by providing a rotor body having an outer circumference, a central axial axis and a radial axis. Then forming opposed rotor slot first and second sidewalls having profiles diverging outwardly in opposite directions from the rotor radial axis and outer circumference by cutting into the rotor body outer circumference along at least one cutting path that is parallel to the central axial axis.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIG. 2 is an axial cross sectional elevation of the prior art rotor bar and corresponding rotor bar slot, taken along 2-2 of FIG. 1;

FIG. 3 is an axial cross sectional elevation of an alternative embodiment of prior art rotor bar and corresponding rotor bar slot, similar to that of FIG. 2;

FIG. 5 is an axial cross sectional elevation of the prior art rotor bar taken along 5-5 of FIG. 4;

FIG. 5A is a detailed view of the rotor bar slot and rotor bar of FIG. 5;

To facilitate understanding, identical reference numerals have been used, where possible, to designate identical elements that are common to the figures.

DETAILED DESCRIPTION

After considering the following description, those skilled in the art will clearly realize that the teachings of this invention can be readily utilized in induction machine rotors and for formation of rotor bar slots in rotors, and especially for non-laminated, solid homogeneous rotor bodies. Rotor bar slots formed in accordance with the teaching of this invention retain rotor bars that are under high centrifugal loads in high speed induction machines, including high speed motors. The rotor slots can be formed with commonly used cutting heads in milling machines or other machining tools, using known machining procedures.

Rotor Bar Slot Profile

Figure 7:
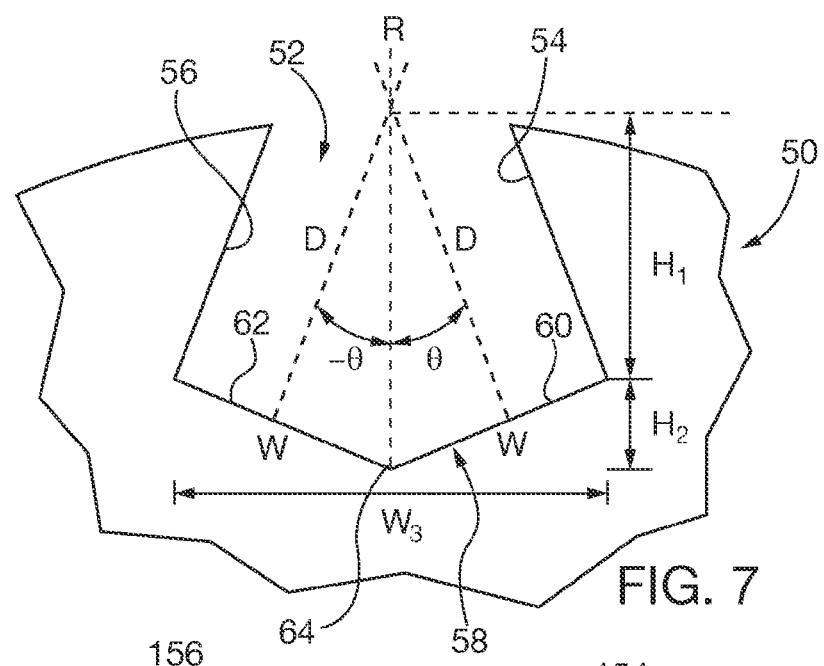
FIG. 7 is a detailed end elevational view of a rotor bar slot of the present invention.
Figure 8:
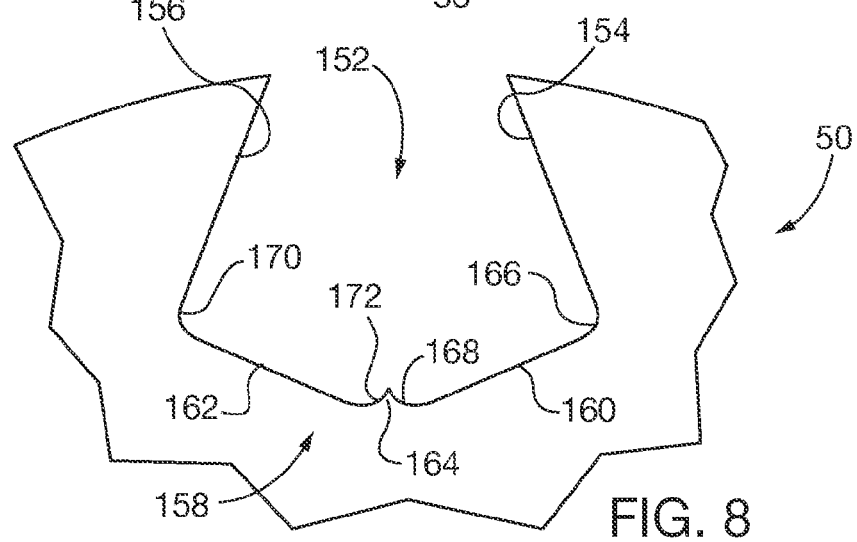
FIGS. 8-10 are detailed end elevational views of alternative embodiments of rotor bar slots of the present invention.

FIGS. 7 and 8 show a rotor body 50 of the present invention, having an outer circumference, axial axis A and radial Axis R. The rotor body 50 is constructed of non-laminated, homogeneous solid steel, but it is also possible to form rotor bar slots 52 in either solid or laminated rotor bodies. In a laminated rotor body the rotor bar slots can be formed in the lamination stamping process, using known fabrication techniques. The rotor body 50 is affixed to a shaft before or after rotor bar slot 52 formation.

Rotor bar slot 52 is formed within the rotor body 50 outer circumference along a cutting path parallel to the axial axis A. Each rotor bar slot 52 has opposed first sidewall 54 and second sidewall 56 having profiles diverging outwardly in opposite directions from the rotor radial axis and outer circumference by respective angles +θ and −θ, and a bottom wall 58 intersecting the first and second sidewalls. The bottom wall 58 profile shown in FIG. 7 has a first portion 60 that is normal to the first sidewall 54 and a second portion 62 that is normal to the second sidewall 56, with both portions intersecting at an apex 64. The apex 64 intersects the rotor radial axis R, and forms an intersecting line between the first and second portions 60, 62 of the bottom wall 58. That intersecting line runs within the entire rotor bar slot 52, and is parallel to the axial axis A. As shown in FIG. 7, the rotor bar slot 52 is has mirror-image symmetry along the rotor body 50 radial axis R. However, the rotor bar slot and corresponding rotor bar may be constructed with asymmetrical profiles so long as the assembled rotor 50 is rotationally balanced sufficiently to minimize operational vibration, within acceptable limits. Similarly, while the sidewalls 54, 56 and bottom wall 58 first and second portions 60, 62 have linear profiles, they may have non-linear profiles, such as curves, and including compound curves, if corresponding cutting tools having those profiles are used to form the rotor slot 52.

Figure 9:
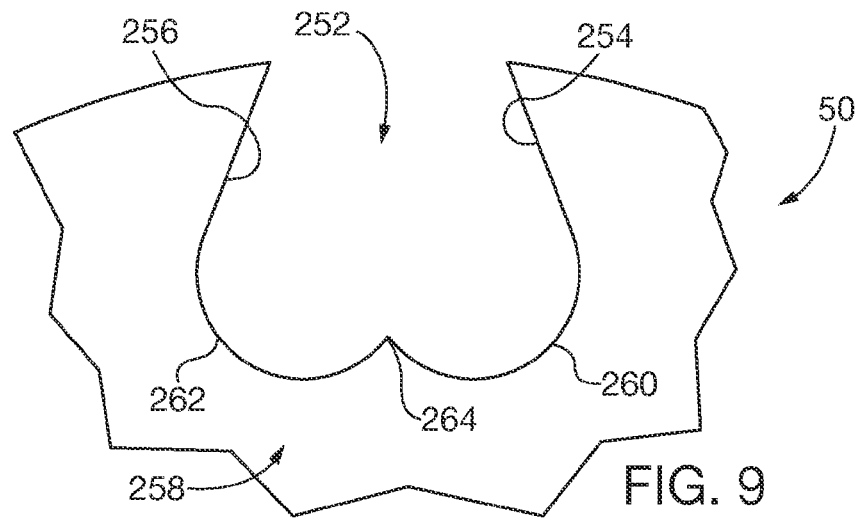
Figure 10:
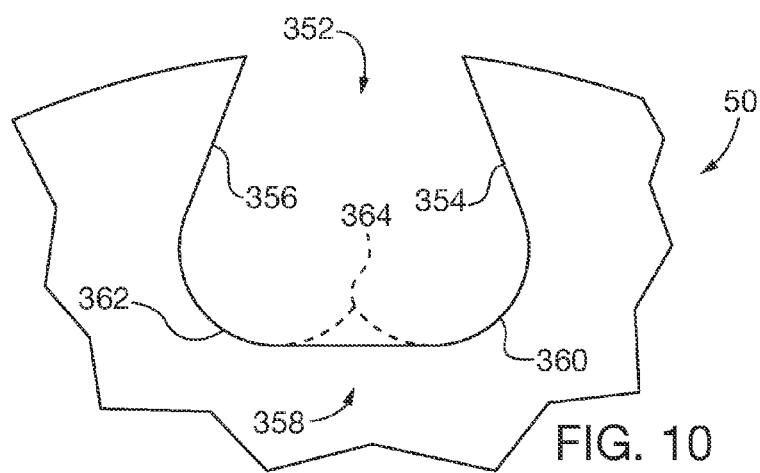

The rotor bar slot profiles of FIGS. 8-10 include curved profile portions. In FIG. 8 rotor bar slot 152 has straight sidewalls 154, 156, but the bottom wall 158 first and second portions 160, 162 have radiused ends 166, 170 adjoining their corresponding sidewalls. The opposite radiused ends 168, 172 intersect and form inwardly projecting rib 164 that is useful for embedding itself into the bottom surface of a rotor bar that is inserted into the rotor bar slot 152. In FIG. 9 the rotor bar slot 252 has diverging, straight linear sidewalls 254, 256 and an end wall that in turn has opposed first and second portions 260, 262 respectively having semi-circular, concave profiles that intersect at rib 264. Referring to FIG. 10, the rotor bar slot 352 has the same sidewall 354, 356 profiles as the slot 252 in FIG. 9. The bottom wall 358 has a flat, ribless profile that is formed by machining off the rib 364 (shown in phantom dotted line in FIG. 9), during the rotor slot 352 formation.

Rotor Bar Slot Formation

The cross sectional profiles of the rotor bar slots 52, 152, 252, 362 of FIGS. 7-10 are generally analogous to a tapered dovetail cut profile and the sidewalls can be formed with a suitably profiled dovetail cutter along a single cutting path that is parallel to the rotor body 50 axial axis A. However, fabrication of such relatively complex cutting tool heads would be relatively expensive and would require additional time for custom fabrication, compared to more commonly available cylindrical profile milling cutters. Also, during rotor bar slot cutting operations, especially in high-strength, hardened solid steel, complex profile milling cutting tools may be susceptible to unacceptably high cutting vibration and cutting tooth wear, as compared to cylindrical profile cutting tools.

Figure 6:
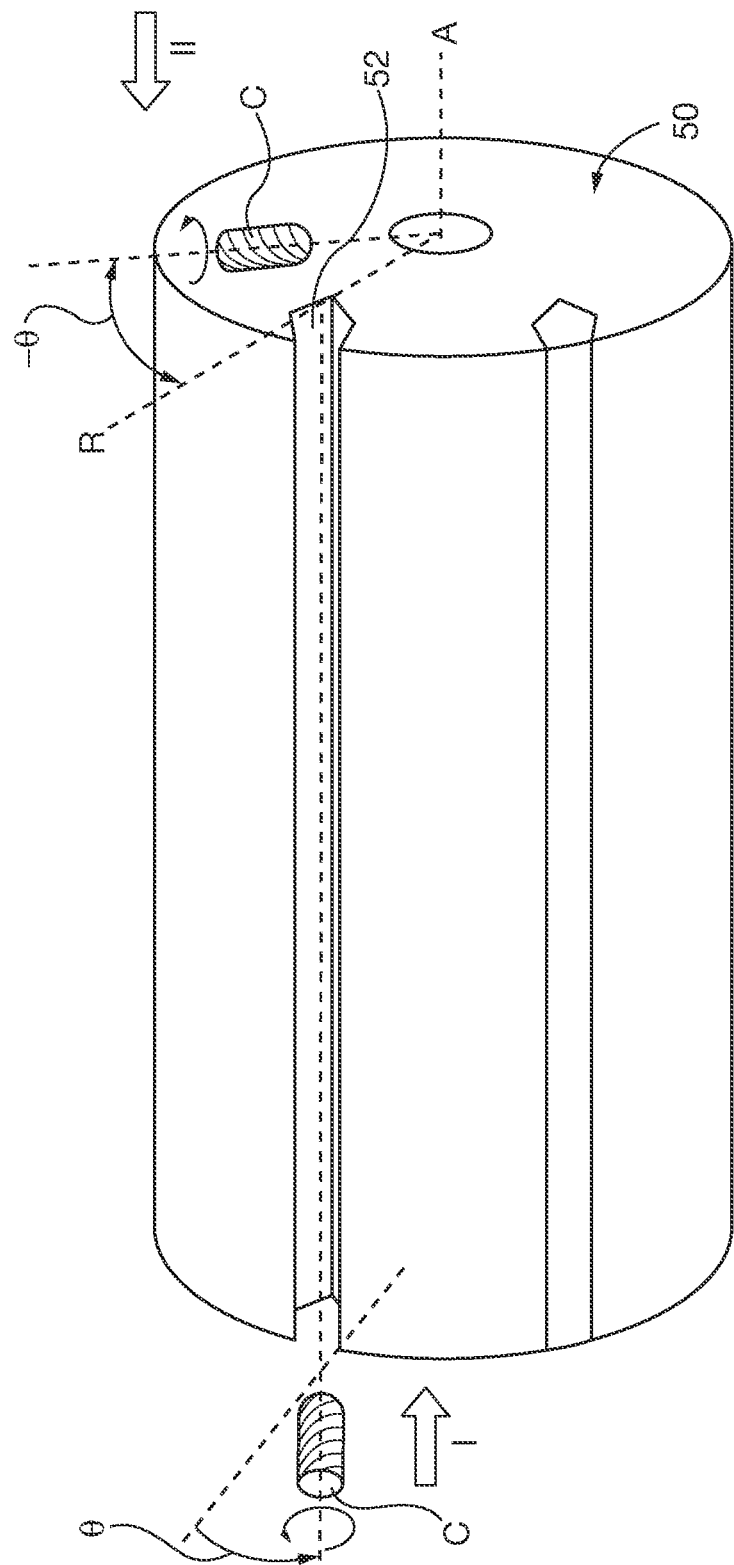
FIG. 6 is a schematic perspective view of a rotor body of the present invention, showing an embodiment of the rotor bar slot formation method of the present invention.

The present invention includes rotor bar slots and their methods of formation. All of the rotor bar slots 52, 152, 252, 362 of FIGS. 7-10 can be formed with commonly available cylindrical cutting heads by milling machines using known machining techniques. Referring to FIGS. 6 and 7, the rotor bar slot 52 is formed by plunge-cut milling the solid steel rotor body 50 with a cylindrical end cutter or slot cutter C, having a 90 degree sharp shoulder between the bottom cutting edge and the cylindrical cutting edge. The rotor body 50 work piece is restrained in an appropriate machining fixture so that the rotor bar slot 52 will be machined at a desired circumferential position and that the rotor body radial axis R is properly indexed relative to the milling machine cutting head rotational axis. In order to form the rotor bar slot profile 52 first sidewall 54 and the bottom wall 58 first portion 60, the cutting tool rotational axis is positioned at angle +θ relative to the rotor body radial axis R. One or a series of plunge cuts (with or without interim cutting tool changes) along cutting path I that is parallel to the rotor body axial axis A forms the first sidewall 54 and bottom wall 58 first portion. Then, the second end wall 56 and bottom wall 58 second portion 62 profiles are formed by orienting the cutting tool rotational axis at angle −θ, and performing one or more plunge cuts along cutting path II. Plunge cut depths and any needed cutting tool lateral translation relative to the cutting path are controlled in or to achieve the desired cross sectional dimensional profiles $H_1$, $H_2$, W and $W_3$.

The rotor slot profile 152 of FIG. 8 is formed with the same general plunge, cutting milling procedures as described above with respect to the slot profile 52 of FIG. 7. When forming the rotor slot profile 152 a radiused end cutter, torus cutter or bullnose cutter-type cutting tool is used in order to form the radiused ends 166, 168, 170, 172. In FIGS. 9 and 10 the respective rotor bar slot profiles 352 and 352 are formed with a spherical-tipped or ball cutter that forms the respective semi-circular radiused first and second portions 260, 262, 360, 362. In the slot profile 252 of FIG. 9 the machining operation forms the upstanding sharp-edged rib projection 264. In the alternative slot profile 352 of FIG. 10 the flat bottom wall 358 is formed by a third plunge cutting or straight traverse cutting pass that removes the rib projection 364 (schematically shown in phantom lines to connote material removal).

While rotor bar slot formation is described herein by use of milling machines and related cutting tools, it should be understood that other types of metal working machinery, such as multi-axis automated machining centers or machine tools utilizing electrical discharge machining (EDM) cutting heads or any other type of metal cutting machinery known to those skilled in the art may be utilized.

Rotor Bar Assembly

Figure 1:
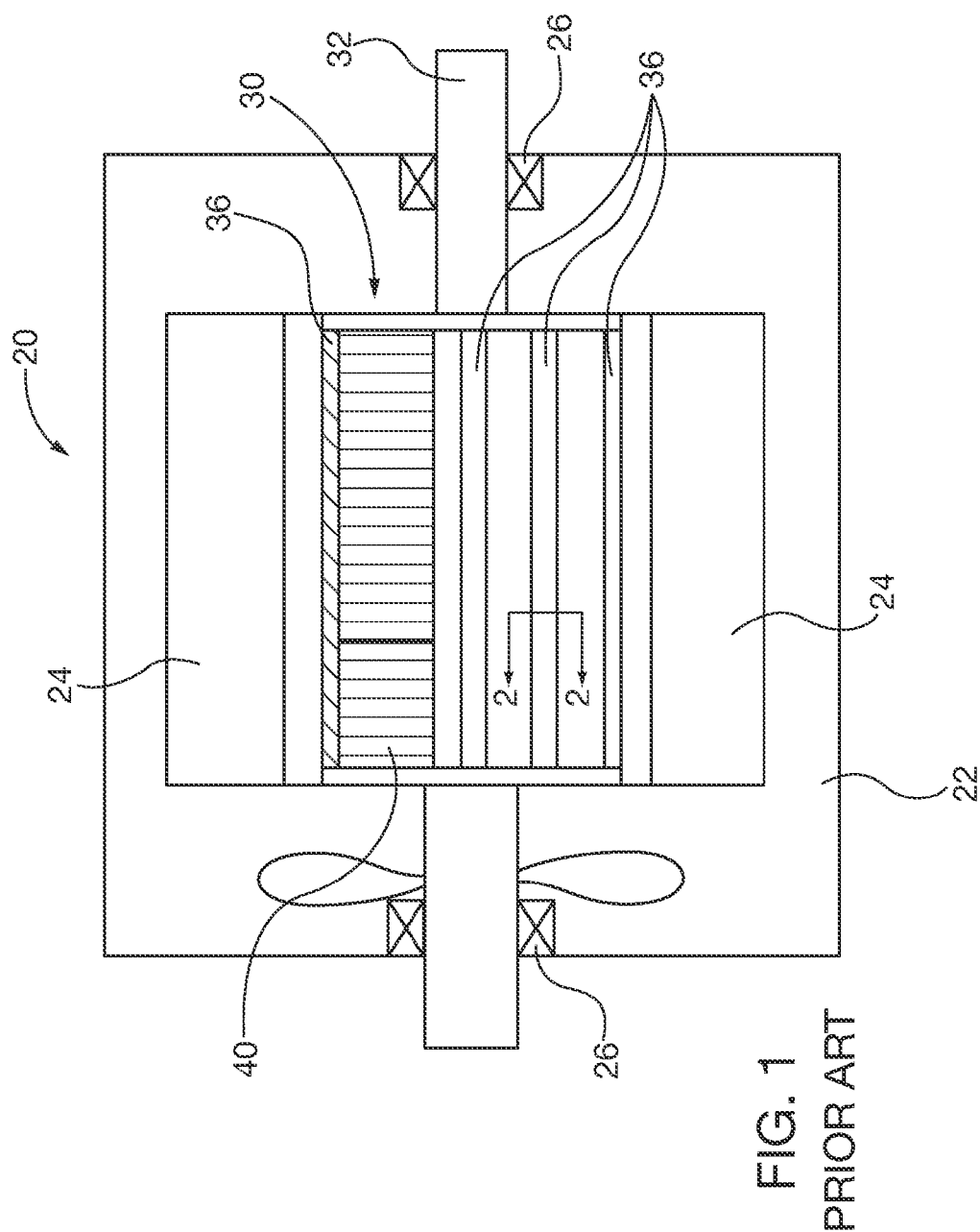
FIG. 1 is a schematic partial cross sectional view of a prior art induction machine motor.
Figure 4:
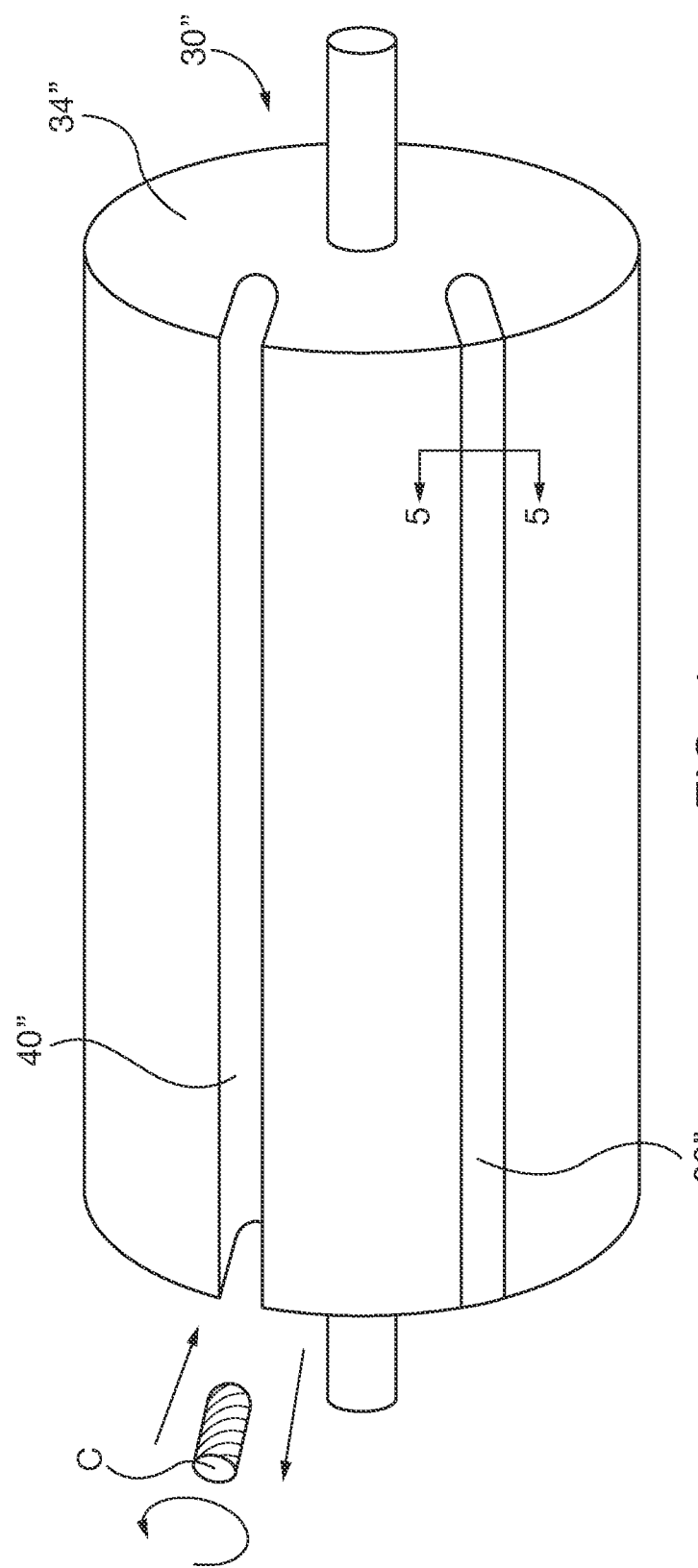
FIG. 4 is a schematic perspective view of a prior art rotor having a solid rotor body and method for forming rotor slots therein.
Figure 11:
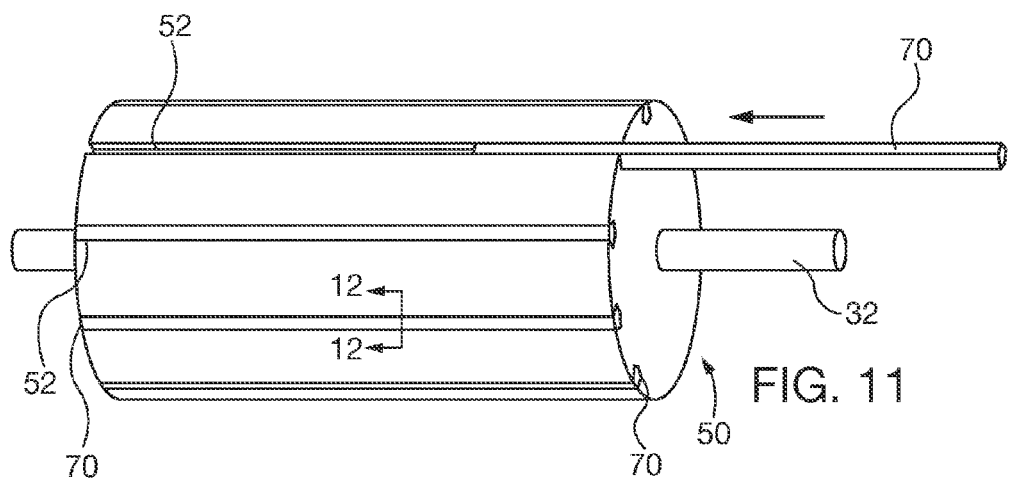
FIG. 11 is a perspective view of a rotor body of the present invention showing rotor bar insertion into a rotor.
Figure 12:
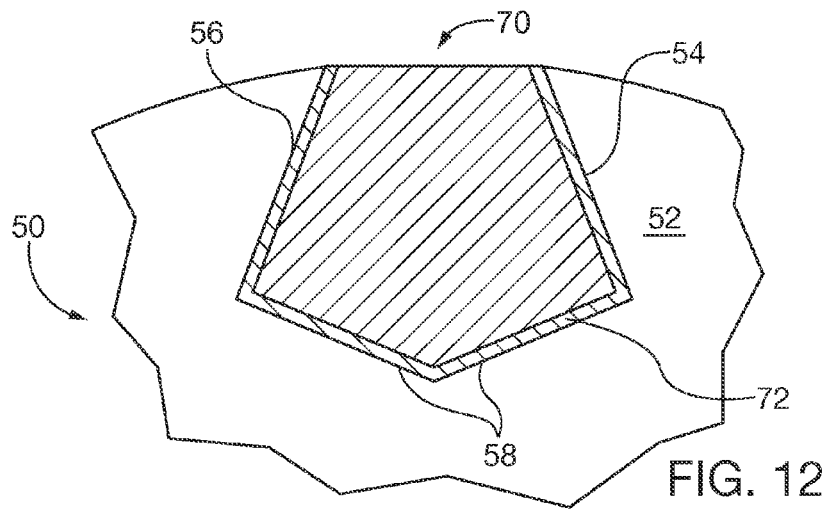
FIG. 12 is an axial cross sectional view of a rotor bar installed in a rotor bar slot of the present invention, to along 12-12 of FIG. 11.

Referring to FIGS. 11 and 12, rotor bars 72 are slidably inserted into their corresponding rotor bar slot 52 using known techniques. It is desirable to capture the rotor bars 72 rigidly in their corresponding rotor bar slots 52, to increase retention when the spinning rotor imparts centrifugal forces on them. The rotor bars 72 may be rigidly coupled to their rotor bar slots 52 with adhesives, such as epoxy layer 72. Alternative coupling means include brazing, soldering, welding, diffusion bonding, swaging, tight mechanical interference frictional fit and shims driven between the rotor bar 72 and its rotor bar slot 52. A completed rotor is installed in an induction machine, such as an electric motor of the type shown in FIG. 1.

Although various embodiments which incorporate the teachings of the present invention have been shown and described in detail herein, those skilled in the art can readily devise many other varied embodiments that still incorporate these teachings.

What is claimed is:

1. An induction machine rotor formed by the process of:
   providing a rotor body having an outer circumference, a central axial axis and a radial axis; and
   forming opposed rotor slot first and second sidewalls having profiles diverging outwardly in a linear manner in opposite directions from the rotor radial axis and outer circumference by plunge cutting with a cutting tool into the rotor body outer circumference along a cutting path that is parallel to the central axial axis,
   wherein the forming step further comprises:
   forming the first sidewall with the cutting tool having a first rotational axis oriented at a first angle outwardly diverging from the radial axis; and
   forming the second sidewall with the cutting tool having a second rotational axis oriented at a second angle outwardly diverging from the radial axis that is opposed from the first angle.

2. A method for forming rotor bar slots in an induction machine rotor comprising:
   providing a rotor body having an outer circumference, a central axial axis and a radial axis; and
   forming opposed rotor slot first and second sidewalls having profiles diverging outwardly in opposite directions from the rotor radial axis and outer circumference by cutting into the rotor body outer circumference along at least one cutting path that is parallel to the central axial axis,
   wherein the forming step further comprises:
   forming the first sidewall with a cutting tool having a first rotational axis oriented at a first angle outwardly diverging from the radial axis; and
   forming the second sidewall with the cutting tool having a second rotational axis oriented at a second angle outwardly diverging from the radial axis that is opposed from the first angle.

3. The method of claim 2, wherein the first and second rotational axes intersect at a common radial axis of the rotor body.

4. The method of claim 2, wherein the first and second sidewalls are formed by plunge cutting in two passes with an identical profile tool along an identical cutting path.

5. The method of claim 4, wherein the plunge cutting is performed with a milling machine and the cutting tool is selected from the group consisting of milling machine end cutters, slot cutters, ball cutters, torus cutters and bullnose cutters.

6. The method of claim 4, further comprising forming a bottom wall intersecting the first and second sidewalls in the same two cutting passes.

7. The method of claim 6, the bottom wall forming further comprising a third cutting pass with a tool concentrically aligned with the rotor radial axis and identical with the sidewall cutting paths.

8. The method of claim 2, further comprising forming a bottom wall intersecting the first and second sidewalls, the bottom wall having a rib radially projecting outwardly toward the rotor outer circumference.

9. The method of claim 2, wherein the rotor body is formed from a homogeneous ferromagnetic material.

10. The method of claim 2, further comprising constructing a rotor by:
    forming a plurality of rotor slots about the rotor outer circumference;
    slidably inserting rotor bars into each of the respective rotor slots; and
    capturing the respective rotor bars within their corresponding rotor slots with coupling means selected from the group consisting of adhesives, frictional interference fit, brazing, soldering, welding, swaging, inserted shims and diffusion bonding.

* * * * *